CIRCUIT ARRANGEMENT FOR SUBSCRIBER'S STATION LINES

Filed Feb. 10, 1955 2 Sheets-Sheet 1

INVENTOR
A. HEYDUCK
BY Robert Harding Jr.
ATTORNEY

CIRCUIT ARRANGEMENT FOR SUBSCRIBER'S STATION LINES

Filed Feb. 10, 1955 2 Sheets-Sheet 2

INVENTOR
A. HEYDUCK
BY [signature]
ATTORNEY

United States Patent Office 2,838,611

Patented June 10, 1958

2,838,611

CIRCUIT ARRANGEMENT FOR SUBSCRIBER'S STATION LINES

Alfred Heyduck, Stuttgart-Zuffenhausen, Germany, assignor to International Standard Electric Corporation, New York, N. Y., a corporation of Delaware Application February 10, 1955, Serial No. 487,397

Claims priority, application Germany February 27, 1954

5 Claims. (Cl. 179—18)

This invention relates to class of service discrimination in private automatic branch exchange telephone systems (P. A. B. X systems).

More particularly the invention relates to a circuit arrangement for subscriber's station lines in such systems, and has for its object the provision of such facilities without the employment of relays additional to the line and cut-off relays usually provided. Thereby it is possible with the different traffic directions, with outgoing central office and local calls, and with incoming calls, to determine the different kinds of restriction. Thus, for example, a subscriber A having the same kind of restriction as the subscriber B with respect to the outgoing central office calls, may have quite a different kind of restriction with respect to local calls. In such case, however, the subscribers may have either the same restriction or a different restriction with respect to incoming calls whereby when one subscriber is called there will be initiated a switching operation in the course of establishing the connection, which will not be effected when the other subscriber is called. In another example, when a particular subscriber establishes an outgoing central office call, a certain switching operation is initiated which, however, does not become effective in the case of certain other subscribers. With respect to local calls, both subscribers may have the same restriction, but they may have different restrictions with respect to incoming calls. In considering the three directions in question (i. e. two outgoing, and one incoming) it is thus possible to combine a wide variety of kinds of restrictions.

These different kinds of restrictions are achieved by the present invention in a simple manner by means of a parallel path in the outgoing and incoming test circuit, which parallel path is controlled by contacts of the line and cut-off relays, the arrangement of such contacts differing with respect to the various kinds of restriction. The test circuits of the selectors for the outgoing traffic and for the incoming traffic are provided with switching means which only become effective and cause the initiation of a predetermined switching operation when such a parallel path exists within the test circuit.

The invention will be particularly described in the following with reference to some exemplified embodiments shown in the Figures 1 to 6 of the accompanying drawings. The circuit diagrams are in simplified form and only show those circuits which are necessary for a proper understanding of the invention.

Figures 1, 2:
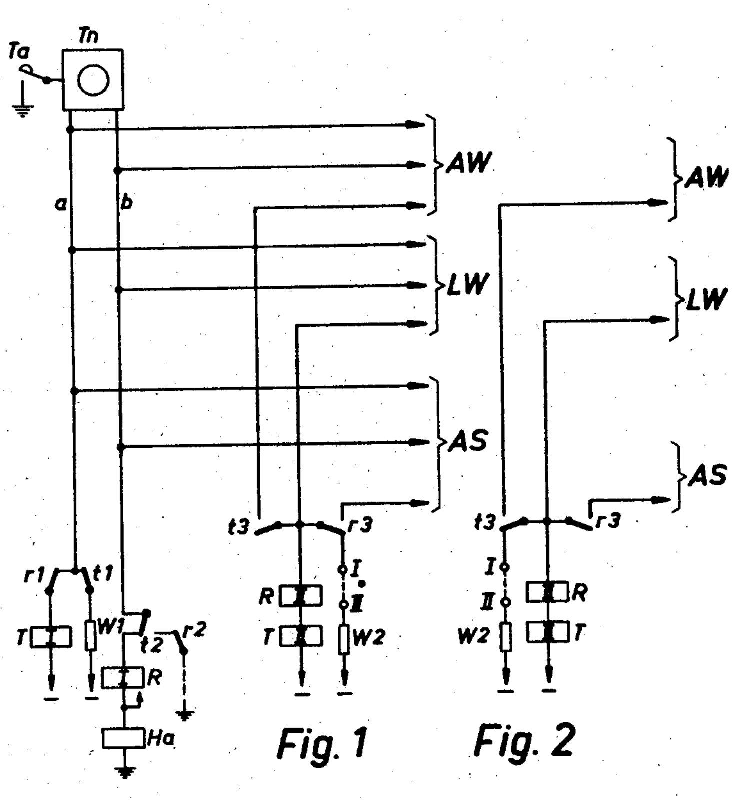
Figure 6:
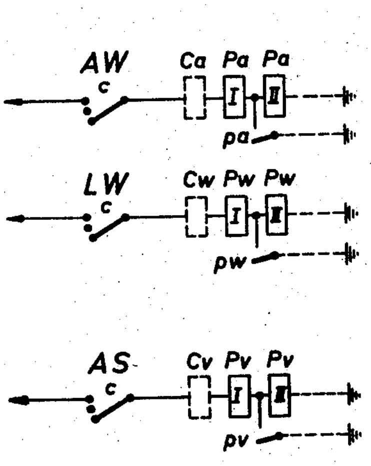

Fig. 1 of the drawings shows a subscriber station line circuit for P. A. B. X systems comprising two relays R and T. The subscriber T*n* has access to a local (internal) connection link via the line finder AS (see also Fig. 6), and to the central office connection link via the office selector AW. These two traffic directions are denoted accordingly by AS or AW respectively. The third direction, i. e. the direction LW, is provided for incoming calls via the final selector switch LW. The three selectors viz. AS, AW and LW, are shown in Fig. 6 in a simplified manner only the test circuits being illustrated.

The operation of this circuit is as follows: When the subscriber at station T*n* lifts the handset, then the line relay R will be energized in the circuit:

$$\text{Battery } \frac{W1,\ t1}{T(I),\ r1},\ a\text{-wire, station T}n,\ b\text{-wire, } t2,\ R(\text{I}),\ \text{H}a,\ \text{ground}$$

Relay T (winding I), which is in parallel with the resistance W1 does not receive sufficient current to operate. Its circuit is opened upon the energization of relay R at contact *r*1. Contact *r*3 serves to identify the calling line in the test circuit of an idle line finder AS, which is taken into use in a conventional manner by a starting relay HA being operated in the energization circuit of relay R. Referring to Fig. 6, when the wiper AS*c* of this line finder engages the line marked as calling by the closure of contact *r*3, then the following test circuit is completed:

Battery T(II), R(II), *r*3, AS*c*, C*v*, P*v* (windings I and II) . . ., ground

In this circuit the relay P*v* and cut-off relay T will be energized, the relay R(II) continues to be energized in this circuit after its winding R(I) has become deenergized on account of the reversal of the contacts *t*1, *t*2. The test relay P*v*, in well known manner, busies the seized line by shorting its high-resistant winding P*v*(II). The relay C*v*, which is of the marginal type, only receives reduced current and is, therefore, prevented from pulling up.

By dialling the wanted number, the subscriber can now establish the desired local connection. Relays T and R remain energized until the connection is interrupted. These operations, however, are well-known and form no part of the invention and will, therefore, not be further explained.

However, if the subscriber wishes to establish a connection to the central office then, after lifting the handset, he will depress the grounding key T*a*, whereby the seized local connection link will be released in conventional manner. The outgoing test wire will be interrupted and the relays R(II) and T(II) will be de-energized. However, only relay R will be completely dropped off, since relay T will be held in the circuit:

Battery T(I), *r*1, *a*-wire, station T*n*, grounding key T*a* ground

After releasing the key T*a* the following holding circuit for relay T is completed:

Battery T(I), *r*1, *a*-wire, station T*n*, *b*-wire, T2, *r*2, . . ., ground

In this circuit there will be energized in known manner a starting relay (not shown), which causes the seizure of an office selector AW of an idle direct exchange line. This office selector AW, which is shown in Fig. 6, hunts for the line identified by the contact *t*3 and the following test circuit will be completed:

$$\text{Battery } \frac{T(II),\ R(II)}{W2,\ I\text{—}II,\ r3},\ t3\ \text{AW}c,\ \text{C}a,\ \text{P}a\ (\text{I and II}),\ldots\ \text{ground}$$

In this circuit relay P*a* will be energized and will busy the line by short-circuiting its high-resistance winding P*a*(II). Relay C*a*, on account of the presence of the parallel path over resistance W2, will likewise be energized. The operation of this relay may be utilized for performing any switching operation to which the particular calling substation is entitled. For example, by this switching operation there may be given the facility for establishing a trunk connection, or it may serve to prevent or restrict the establishment of such a connection. Relay R(II) pulls up and interrupts at contacts *r*1 and *r*2 the circuit for relay T(I). However, relay T will continue to hold in the test circuit of the office selector AW via its winding T(II). The further switching operations in the establishment of the desired connection are well-known and do not require any further explanation. The points I and II in the parallel path may be bridged by means of a soldered jumper wire connection, or by means of a switch or key. In the latter case there exists the possibility of optionally changing the type of restriction of the subscriber so that e. g. when an office selector AW finds the calling line the relay *Ca* will be provided with a reduced current, on account of which the switching operation, which has been initiated by this relay, will be prevented from becoming effective.

If the substation T*n* is seized by a final selector switch LW (Fig. 6), on an incoming call then the following test circuit will be completed:

$$\text{Battery } \frac{T(II),\ R(II)}{W2,\ II\text{—}I,\ r3},\ \text{LW}c,\ \text{C}w,\ \text{P}w\ (I \text{ and } II), \ldots, \text{ground}$$

Since the parallel path is also present and effectively interconnected in this case, the relays C*w* and P*w* will be operated and the relay C*w* is able to initiate a switching operation. The relays R(II) and T(II) are likewise energized in this circuit and disconnect the windings R(I) and T(I) from the *a* and *b* wires of the connecting line. The further operations are without interest in connection with the invention and therefore, will not be further described.

With reference to Figs. 2 to 5 there will now be described a number of other possible kinds of restrictions of subscribers. The contacts *t*3 and *r*3 of these figures correspond to the contacts having the same designation in Fig. 1. Their arrangement, however, is different in each case, thereby achieving a different connection and controlling of the parallel circuit and, consequently, a different kind of restriction of the subscriber's station lines. In other respects the subscriber's station line circuit corresponds to that of Fig. 1. It has, therefore, been omitted in the Figs. 2 to 5.

In Fig. 2 the parallel circuit including resistance W2 is interconnected in the case of local (internal) and incoming connections so that when the corresponding selector AS or AW, respectively, of these directions serve a calling line, the relays C*v* or C*a* respectively, which are responsive to a current increase, will become effective and initiate those switching operations, to the performance of which the particular substation is entitled.

Figures 3, 4, 5:
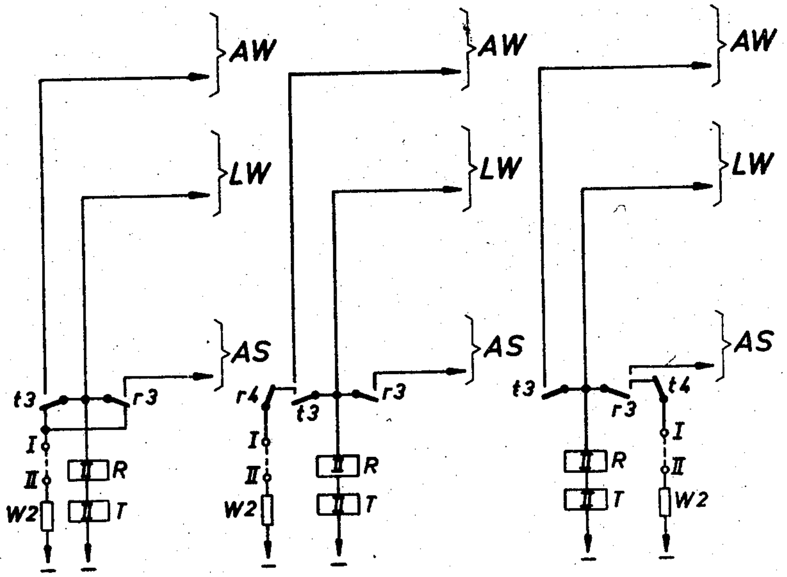

In Fig. 3 the parallel path is interconnected for all directions of traffic.

In Fig. 4 the parallel path is only effective when establishing an outgoing central office connection, whilst being disconnected in the case of incoming calls and local (internal) connections.

In Fig. 5, finally, there is shown a substation circuit, in which the parallel path is only interconnected in the case of internal connections, so that only in the case of such connections the relay C*v*, which is arranged in the test circuit of the line finder AS, will be energized, whereas the relay C*a* or C*w* respectively, of the two other directions will remain de-energized on the completion of the test circuit.

As may be seen from the foregoing, the invention provides a circuit arrangement with the aid of which it is possible without requiring any substantial expenditure, to provide a substantial number of groups of substations with the most varied kinds of restriction.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. In a telephone system a substation line, a substation line circuit comprising a line relay and a cut-off relay a plurality of switches having access to said line circuit each of said switches being adapted to extend a connection in a different traffic direction, a test conductor in said line circuit for each said switch, means for applying a marking potential to a selected test conductor to indicate that the substation line circuit is in a calling condition, an auxiliary circuit forming a path parallel to a portion of said line circuit, contacts for said line and cut-off relays arranged to control the connection or disconnection of said parallel path to or from said last-mentioned test conductor dependent upon the kind of restriction to be provided for calls in the different traffic directions, test circuits in said switches, and discriminating means in said test circuits adapted to respond to the presence of said parallel path when connected to said test conductor.

2. A telephone system circuit, according to claim 1, wherein said parallel path comprises a resistance connected to a source of current and said discriminating means comprises a marginal relay for each switch connected in its said test circuit and arranged to operate due to an increased current flowing through its winding when said parallel path is connected to said test conductor.

3. A telephone system circuit, according to claim 1, wherein said parallel path is connected to a terminal point adapted to be connected to said test conductor by a removable jumper wire.

4. In a telephone system a substation line, a substation line circuit comprising a line relay and a cut-off relay, a plurality of switches having access to said line circuit, each of said switches being adapted to extend a connection in a different traffic direction, a test conductor in said line circuit for each said switch means for applying a marking potential to a particular one of said test conductors over windings of said line and cut-off relays to indicate that the substation line is in a calling condition, a discriminating circuit, means controlled by said line and cut-off relays for connecting said discriminating circuit to said last-mentioned test conductor in parallel with said windings or for disconnecting it therefrom dependent upon the kind of restriction to be provided for calls in the different traffic directions, test circuits in said switches, and discriminating means in said test circuits adapted to respond differently according to the parallel connection or disconnection of said discriminating circuit in said line circuit.

5. A telephone system circuit, according to claim 4, wherein said substation line forms part of a private automatic branch exchange and said switches are respectively adapted to be used in the establishment of internal local calls, outgoing calls to a central office, and calls incoming to the private branch exchange.

References Cited in the file of this patent

UNITED STATES PATENTS

| | | |
|---|---|---|
| 2,416,131 | Voss | Feb. 18, 1947 |
| 2,494,475 | Hersey | Jan. 10, 1950 |